United States Patent
Head et al.

(10) Patent No.: US 7,854,414 B2
(45) Date of Patent: Dec. 21, 2010

(54) CABLE CLAMPS

(75) Inventors: Phil Head, West Drayton (GB); Marcus Dixon, Great Yarmouth (GB)

(73) Assignee: Artificial Lift Company Limited, Great Yarmouth Norfolk (GB)

( * ) Notice: Subject to any disclaimer, the term of this patent is extended or adjusted under 35 U.S.C. 154(b) by 336 days.

(21) Appl. No.: 11/630,058

(22) PCT Filed: Apr. 20, 2005

(86) PCT No.: PCT/GB2005/001489

§ 371 (c)(1),
(2), (4) Date: Oct. 14, 2008

(87) PCT Pub. No.: WO2005/103544

PCT Pub. Date: Nov. 3, 2005

(65) Prior Publication Data

US 2009/0126162 A1    May 21, 2009

(30) Foreign Application Priority Data

Apr. 20, 2004 (GB) ................... 0408704.5
Oct. 5, 2004 (GB) ................... 0422061.2

(51) Int. Cl.
*F16L 3/00* (2006.01)

(52) U.S. Cl. .............. 248/61; 24/20 R; 29/525.05; 248/74.3

(58) Field of Classification Search ............ 248/61, 248/62, 63, 74.1, 74.2, 74.3; 24/20 R, 20 EE, 24/20 CW, 20 W; 29/525.01, 525.02, 524.14

See application file for complete search history.

(56) References Cited

U.S. PATENT DOCUMENTS

| 2,651,484 | A | * | 9/1953 | Marchetti ................. 248/61 |
| 3,632,071 | A | * | 1/1972 | Cameron et al. ........... 248/74.3 |
| 4,308,648 | A | * | 1/1982 | Fay ........................... 24/274 R |
| 4,562,982 | A | * | 1/1986 | McSherry et al. ......... 248/61 |
| 5,598,995 | A | * | 2/1997 | Meuth et al. ............... 248/74.3 |
| 6,481,673 | B1 | * | 11/2002 | Roe et al. .................. 248/62 |
| 7,229,052 | B2 | * | 6/2007 | Takeuchi .................... 248/71 |
| 7,389,568 | B2 | * | 6/2008 | Crockett et al. ........... 24/274 R |
| 7,603,751 | B2 | * | 10/2009 | Caveney et al. ........... 24/20 R |
| 2006/0277724 | A1 | * | 12/2006 | Sakazaki .................... 24/20 R |
| 2007/0022578 | A1 | * | 2/2007 | Crockett et al. ........... 24/274 R |
| 2009/0139062 | A1 | * | 6/2009 | Ryhman et al. ........... 24/20 LS |

FOREIGN PATENT DOCUMENTS

| EP | 1063459 A1 | * | 12/2000 | |
| GB | 2267137 A | * | 11/1993 | .............. 248/74.1 |
| GB | 2281584 A | * | 3/1995 | .............. 403/187 |

* cited by examiner

*Primary Examiner*—Ramon O Ramirez
(74) *Attorney, Agent, or Firm*—Andrew Wilford

(57) ABSTRACT

A cable clamp device for use in a well bore to secure cables to pipes and the like includes a flexible fastening member of relatively uniform cross-section, and a block that accepts the fastening member as it encompasses the circumference of the pipe in a loop. The cable clamp also and accepts the cable running axially along the pipe. The flexible fastening member overlaps itself, and is secured in a loop by deformation of its material. The height of the block from the surface of the pipe is greater than the height of the outer surface of the flexible fastening member and the surface of the pipe. The end surfaces of the clamp are angled with respect to the perpendicular of the pipe's surface.

12 Claims, 7 Drawing Sheets

CABLE CLAMPS

The present invention relates to cable clamps for retaining cables to tubing in a wellbore, risers in the ocean or flowlines along the seabed.

Cables are often used in the oil industry to conduct electricity, in order to power and control downhole tools and to transmit signals from sensors. When installed in a wellbore, the cable is often closely secured to the exterior of the production tubing so that it is not damaged by the sides of the wellbore as the production tubing is lowered into the well. Other types of conduits, such as hydraulic tube and fibre optic cable, may also be disposed along the production tubing.

A known cable clamp comprises two clamp members separated by a bridging section. Each clamp member has two arcuate sections joined by a pivot. The arcuate sections can be opened to accommodate a production tubing section with a cable positioned along the pipe section's length, and then closed around the pipe section to encircle it, the free ends of the arcuate sections being joined together by a screw located on the free end of one arcuate section which co-operates with a threaded hole located on the free end of the other arcuate section.

Cable clamps must often be applied to the pipe section and cable in difficult conditions, and it is also important that each clamp can be applied quickly and reliably. It can be difficult to reliably secure the locking mechanism of known clamps, and the cable clamp may be damaged when the user attempts to attach it, so that the cable clamp has to be returned for reconditioning.

Cable clamps are usually placed at a tubing coupling to protect the cable(s) over the coupling, however a drawback of conventional cable clamps is that they have to be customised to the production tubing and the specific number of cables required for the well installation.

The object of the present invention is to provide a cable clamp which is convenient to operate and cost effective to manufacture and fit.

According to the invention, there is provided a cable clamp device for use in a well bore to secure cables to pipes and the like, including a flexible fastening member of relatively uniform cross-section, and a block that accepts the fastening member as it encompasses the circumference of the pipe in a loop, and accepts the cable running axially along the pipe.

According to another aspect of the present invention, there is provided a method of securing cables to pipes and the like to be disposed in a wellbore, including the steps of placing a cable axially along the pipe, wrapping a flexible fastening member of relatively uniform cross-section around the pipe so that the flexible fastening member overlaps to some degree, tensioning the flexible fastening member, and deforming the fastening member in the overlapping region to secure it.

Cable clamps according to the present invention will now be described, by way of example, and with reference to the drawings, of which;

Figure 1:
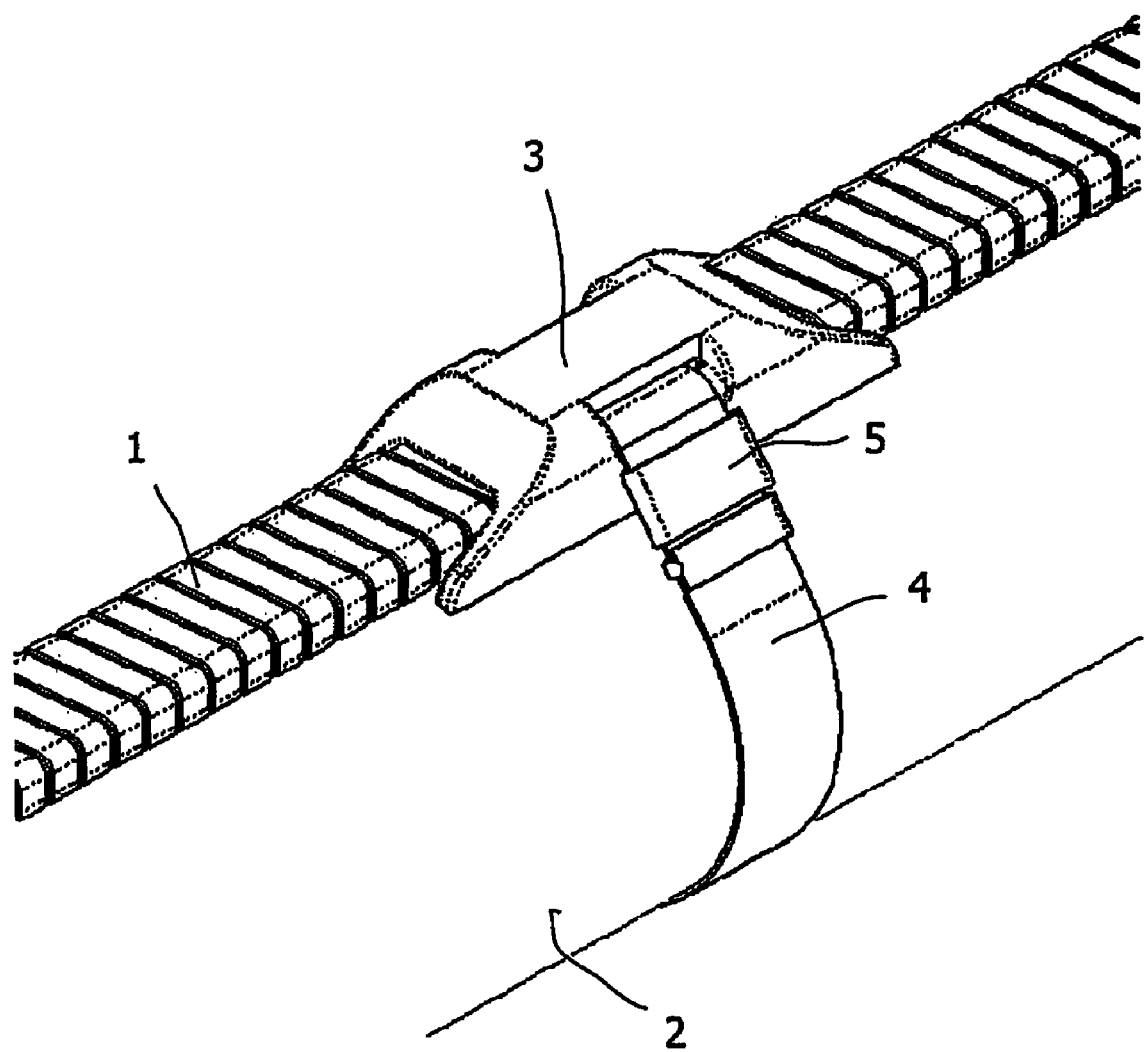
FIG. 1 is an isometric view of the one piece cable clamp, securing a flat armoured cable to a tube.
Figure 2:
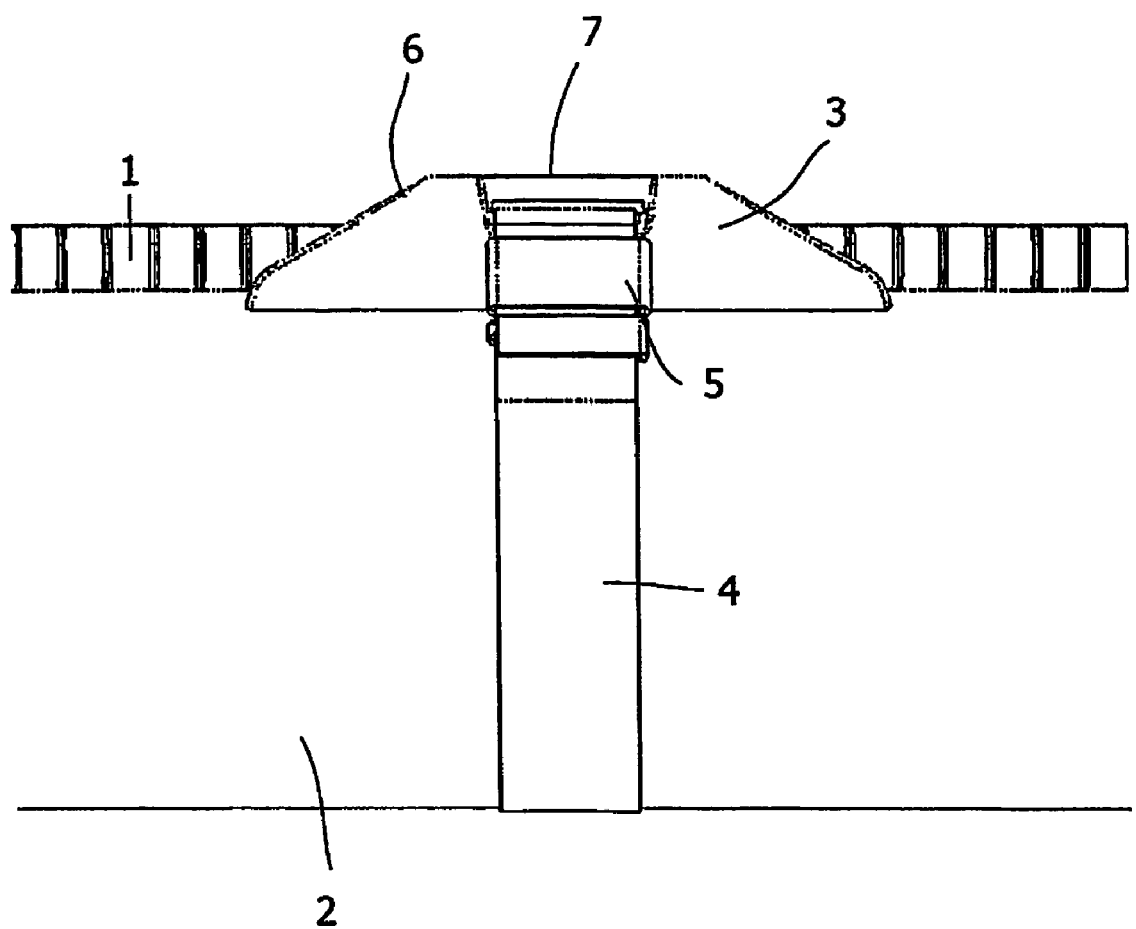
FIG. 2 is a side view of the clamp shown in FIG. 1.

Referring to FIGS. 1 to 7 a flat armoured cable 1 is secured to the side of a tube 2 by a cable saddle 3, which fits snugly around the cable and a band 4 which may be plastic or steel or a combination of both, this is tensioned by a machine not shown and then a metal seal 5 retains the tension. The cable saddle has generous lead and trailing angles 6 which ensure it is deflected from anything standing proud into the bore hole. The top of the saddle provides stand off and prevents the cable from coming into contact with the borehole.

Figure 3:
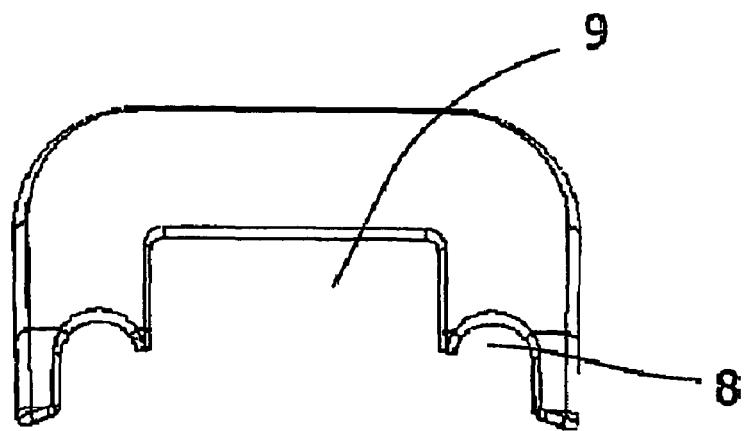
FIG. 3 is an end view if a clamp configured to hold two ¼" round tubes and two 11 mm×11 mm instrumentation lines
Figure 4:
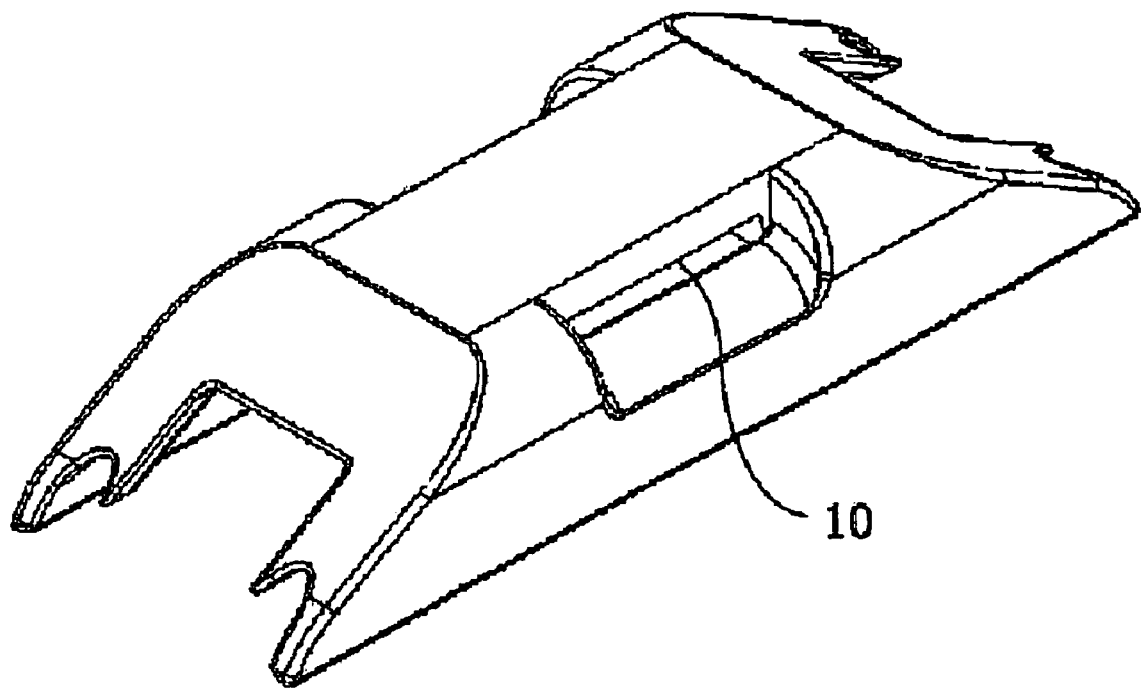
FIG. 4 is an isometric view of FIG. 3

The internal profile can be changed to suit any combination of cables. FIGS. 3 and 4 show the internal profile has been modified for two ¼" round conductors 8 and two 11 mm×11 mm instrumentation cables 9 down the middle. The slot 10 is also clearly visible which enables the band to be fully enclosed by the cable saddle.

Figure 5:
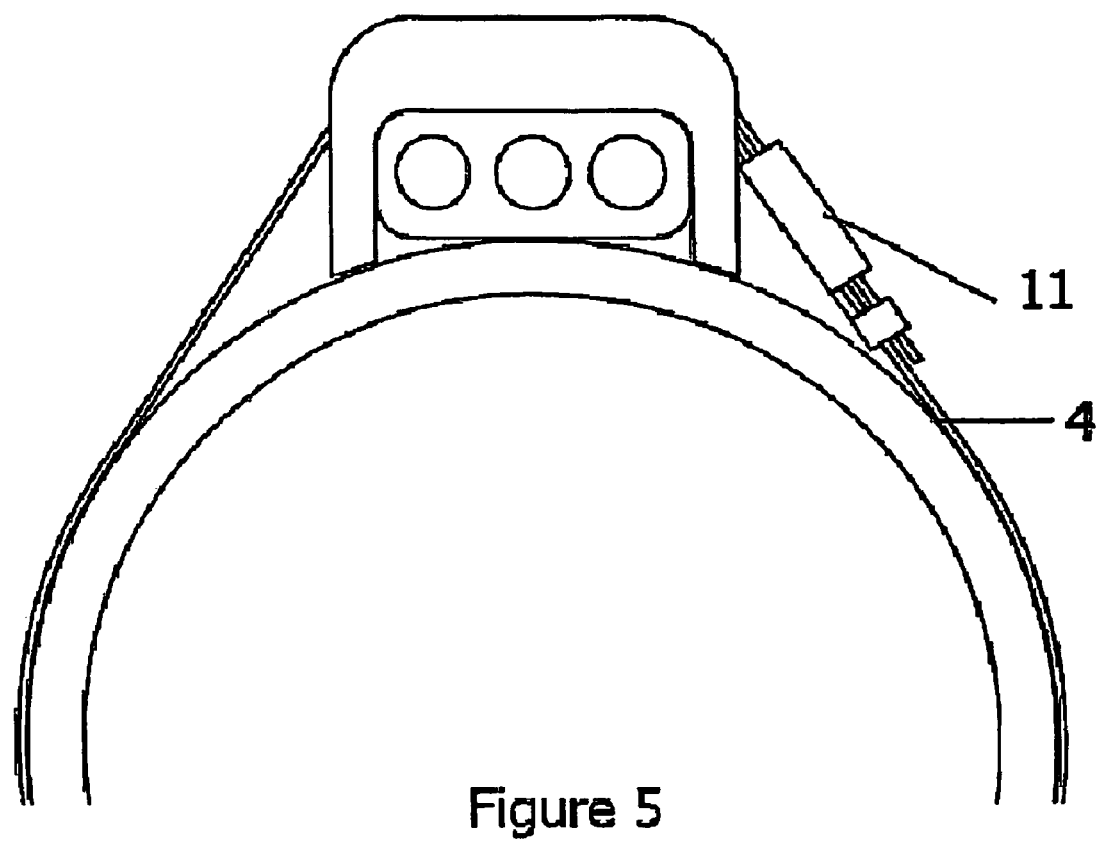
FIG. 5 is an end view of the clamp, cable and tube, retained by a plastic band and secured with a metal seal
Figure 6:
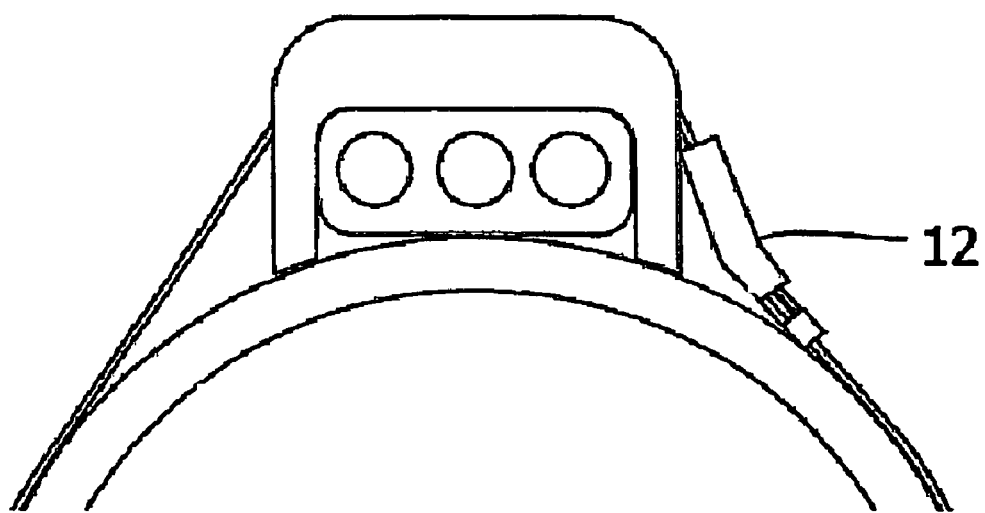
FIG. 6 is a similar view to FIG. 5, with the metal clip indented to reduce its projected profile.

FIG. 5 shows the profile set up for a single 3 core flat pack cable assembly. The metal seal 11 is compressed together when the band 4 has the required tension applied. To eliminate the chance of the seal clipping anything in the bore hole after it is compressed it could also be indented 12, to bring its profile as close to the cable saddle as possible.

Figure 7:
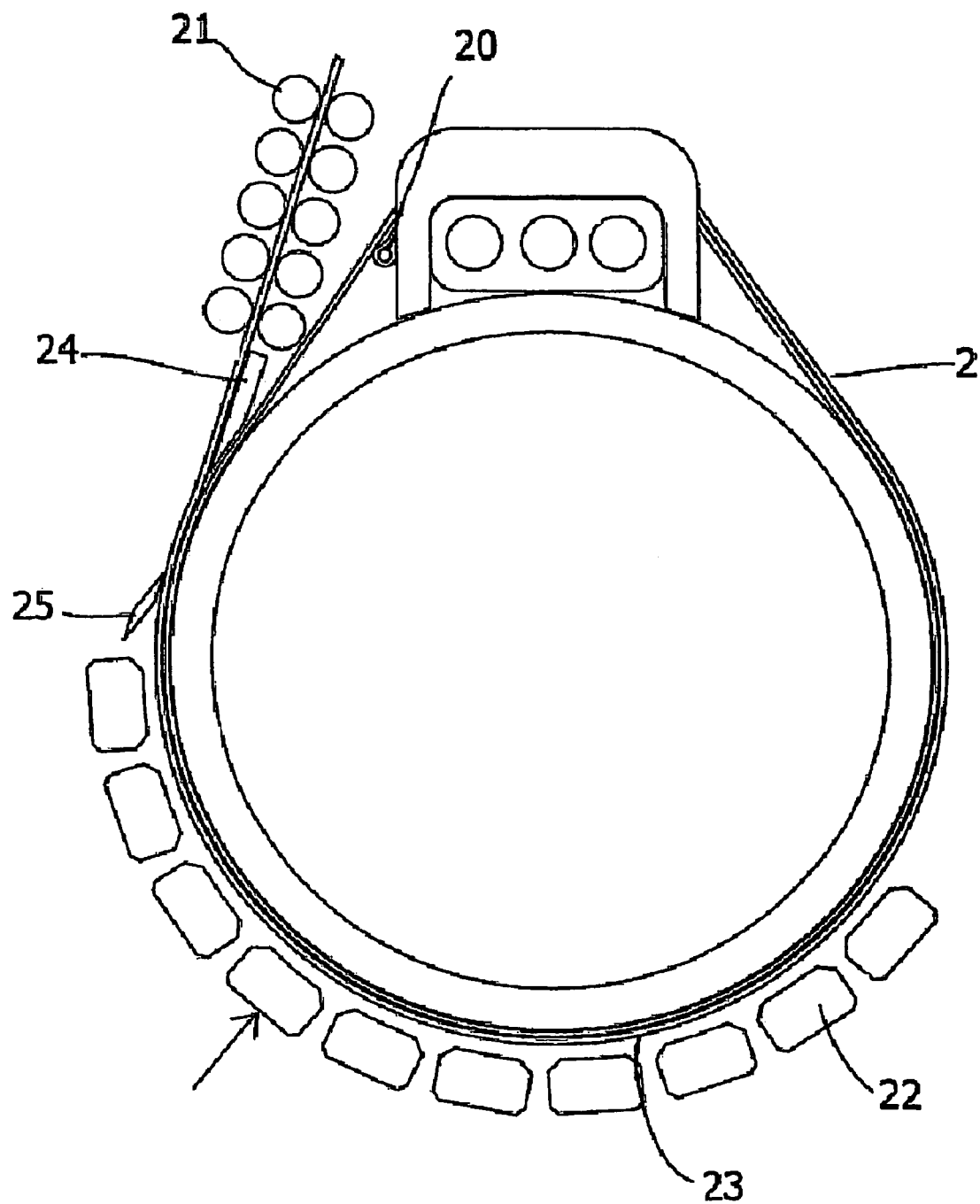
FIG. 7 is an end view of the clamp, cable and tube retained by a plastic band which is being vibration welded together.

FIG. 7 shows a further embodiment of the invention, in this embodiment the plastic band is secured to one end of the cable saddle 20, the band is wrapped around almost 2 times and the tension wheels 21 apply sufficient tension. Part of the. same tool will be mechanically applied vibration pads 22. These are pushed hard against the plastic strap and vibrated for a required period of time. The tube 2 acts as an anvil, the interface between the two layers of plastic band 23 melts, when the mechanical vibration is turned off the plastic band is welded to itself, thereby eliminating the metal seal. The excess band is cut off using a knife cutter 24 and reaction face 25.

An advantage of the invention is that it may be manufactured by injection moulding, to ensure low cost tooling. The design can be made so that it is a simple open and shut tool (i.e. no side actions etc, which increase cost, complexity and reliability).

A further advantage of the present invention is that it protects the cable over a tubing coupling Two or more clamps may be piggy backed together and held by a single strap.

Figure 8:
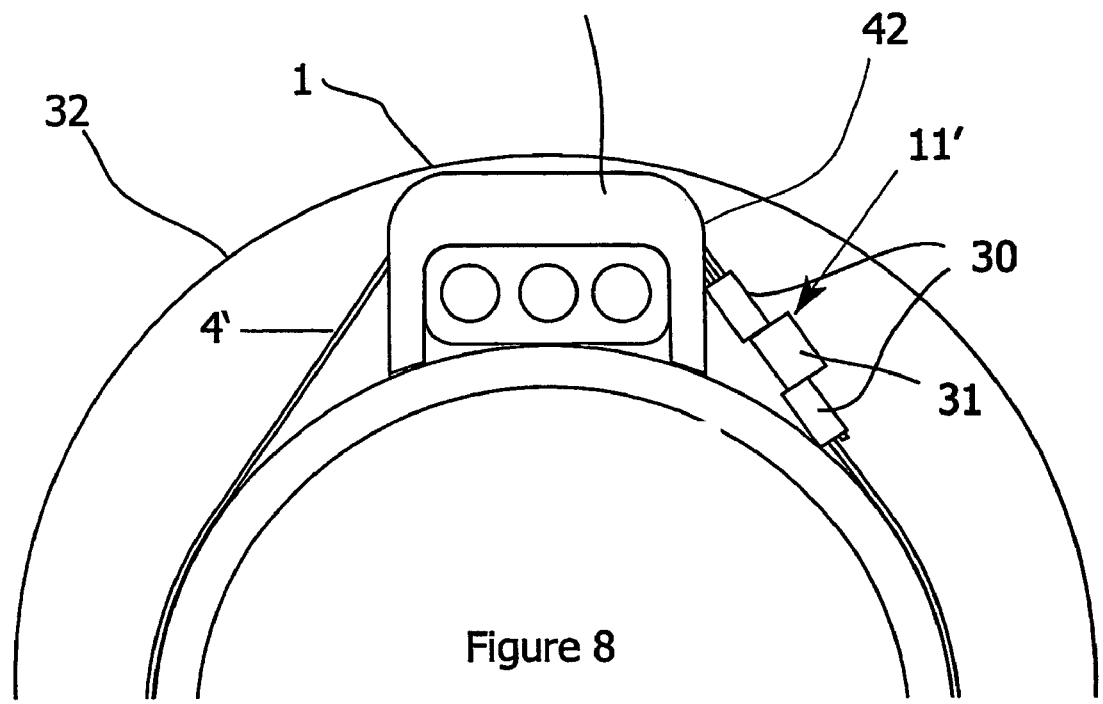
FIG. 8 is a cross-sectional view of another embodiment of the clamp, cable and tube.
Figure 9:
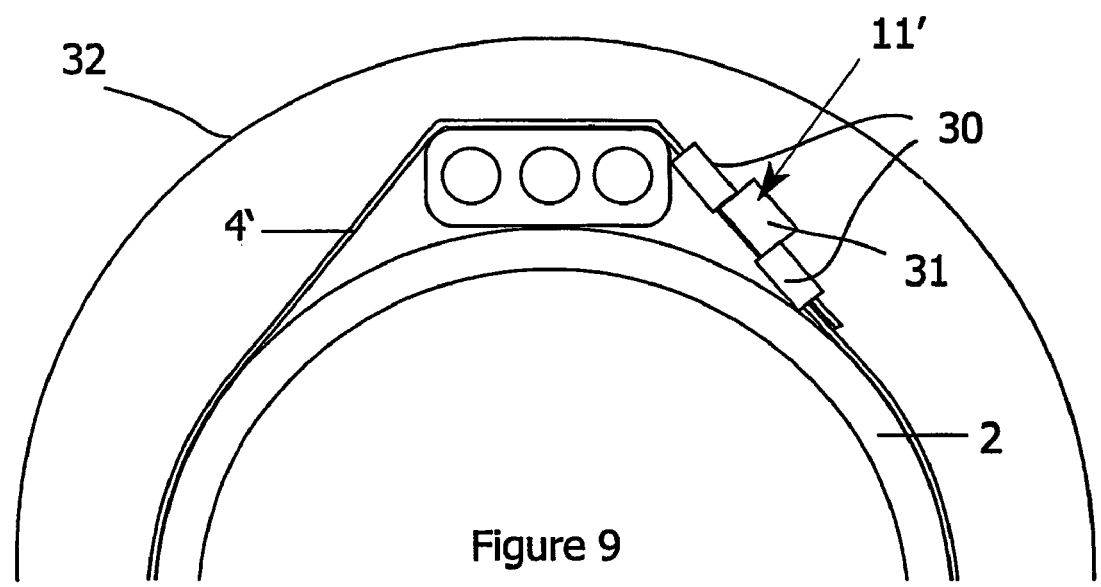
FIG. 9 is a cross-sectional view of another embodiment of the clamp, cable and tube.

FIGS. 8 and 9 show a cable 1 clamped to a pipe 2 respectively with and without a cable protection block 3. In this example a metal band 4' has been employed to hold the cable 1 and (in the case of FIG. 8) cable protection block 3 to the pipe 2. Once the required tension has been applied to the metal band 4', a seal or lock 11' is produced by shearing the metal band 4' in two directions, two sides of the shear 30 are pushed towards the pipe and the centre portion 31 of the shear is pushed out away from the pipe. The casing 32 through which the pipe 2 is conveyed is jointed pipe having connections approximately every 12 m, it is at this connections that the seal 11' can snag and be broken. It is clear from the section side view that the seal 11' is far better protected from being broken by the addition of the cable protection block 3.

Figure 10:
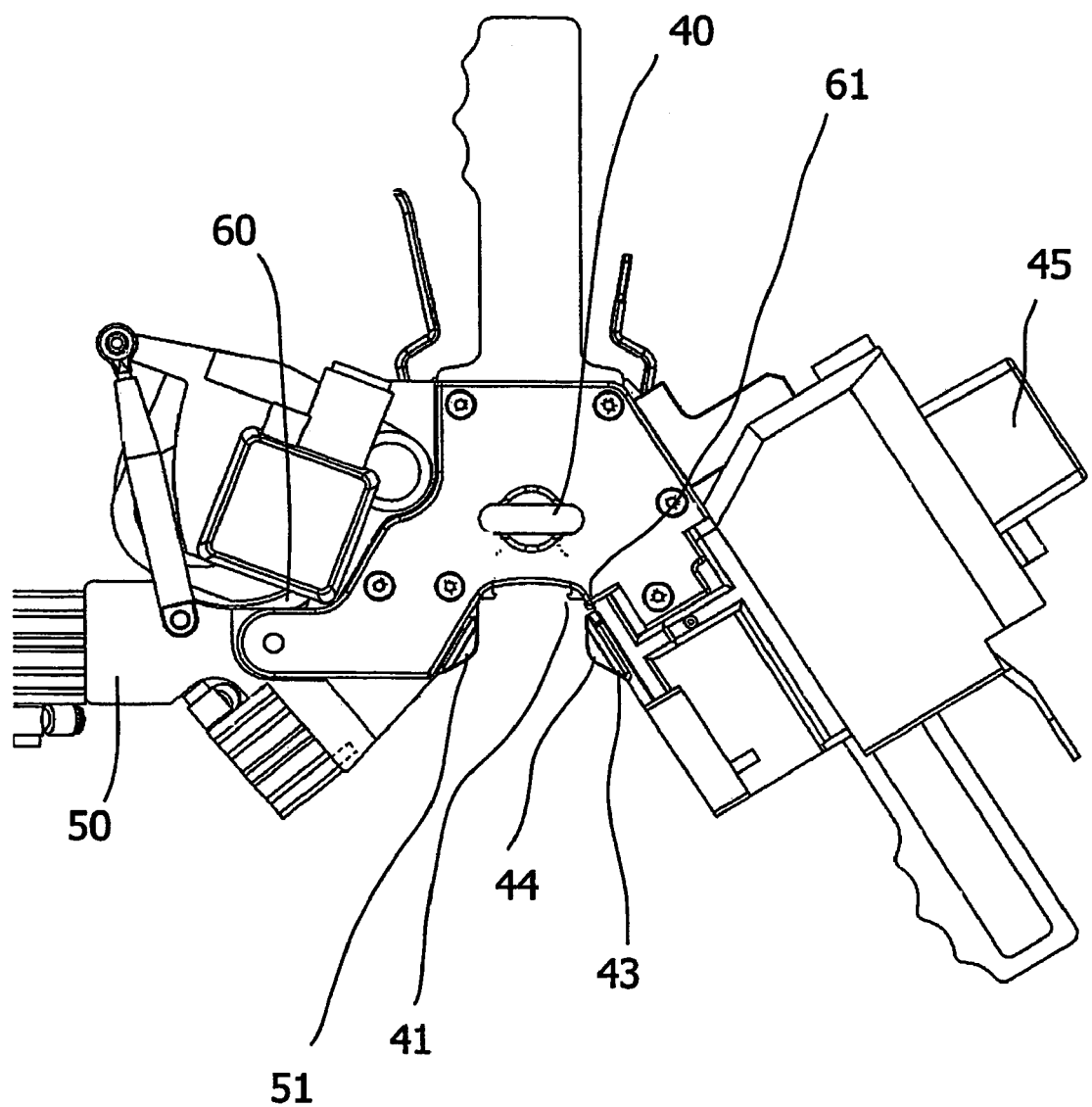
FIG. 10 is a view of a machine suitable for securing a cable with a clamp.

FIG. 10 shows a top view of the friction welding machine. The machine is suspended by a line which connects to an eye 40, roughly at the centre of gravity of the machine to help the user manoeuvre it. The cable protection block 2 together with the plastic band is loaded into the machine and is held by two pneumatic operated gripper blocks 41, the gripper blocks holding the cable protection block 2 at the same location 42 as where the band enters through slot 10 (visible in FIG. 4). A pneumatically operated friction gripper 50 pushes against the band (not shown) and the friction gripper anvil 51. The machine operator then wraps the band around the pipe 2 (not shown) and feeds the band through the slot 43 between a friction welding anvil 44 and a friction welding head 45. As the band is pushed through the slot between the friction welding anvil 44 and friction welding head 45, it passes through the slot 10 in the cable protection block 2, and is pushed further into the assembly until the band reaches the tension wheel 60. This is pneumatically powered and when energised pulls the band tight against the pipe 2. When the band is at the required tension the friction welding head is activated and the welding head friction welds the tensioned band against itself, for example by forming a shear 11' as previously described. Finally, excess band material is cut by a pneumatically operated knife located at 61. This cuts the excess material away from the band at the entrance 10 to the cable protection block. Therefore no loose flapping band material can snag when the pipe 2 and cable 1 is lowered into the well.

The invention claimed is:

1. In combination with a downhole pipe and a cable extending axially along and lying against the pipe, a cable clamp comprising:
    a saddle block engaged over the cable and pressing the cable directly against the pipe; and
    a flexible fastening member of relatively uniform cross section wrapped around the pipe and in a closed loop and engaging the block to press the cable directly against the pipe at the block.

2. The cable clamp according to claim 1, wherein the flexible fastening member overlaps itself, and is secured in a loop by deformation of its material.

3. The cable clamp according to claim 1, where a height of the block from an outer surface of the pipe is greater than a height of the outer surface of the flexible fastening member and the outer surface of the pipe.

4. The cable clamp according to claim 1, wherein ends of the clamp are angled with respect to a perpendicular of an outer surface of the pipe.

5. The cable clamp according to claim 1, wherein the flexible fastening member is of plastic.

6. The cable clamp according to claim 1, wherein the flexible fastening member is of metal.

7. The cable clamp according to claim 1, wherein the flexible fastening member is secured in a loop by welding.

8. The cable clamp according to claim 1, wherein the flexible fastening member is secured in a loop by shearing.

9. A method of securing a cable to a downhole pipe, the method comprising the steps of:
    laying the cable directly against and extending axially along the pipe;
    fitting a saddle block to the cable so as to press the cable underneath the saddle block directly against the pipe;
    wrapping a flexible fastening member of relatively uniform cross section around the pipe and engaging the member with the block; and
    fastening ends of the member together to form the member into a closed loop and thereby fix the block to the pipe and press the cable at the block directly against the pipe.

10. The method according to claim 9, further comprising the step of
    threading the fastening member through the block, the block being shaped to accept the cable.

11. The method according to claim 9, wherein the flexible fastening member is secured in a loop by welding.

12. The method according to claim 9, wherein the flexible fastening member is secured in a loop by shearing.

* * * * *